H. WYANT.
Seed Planter.
No. 16,198.
Patented Dec. 9, 1856.
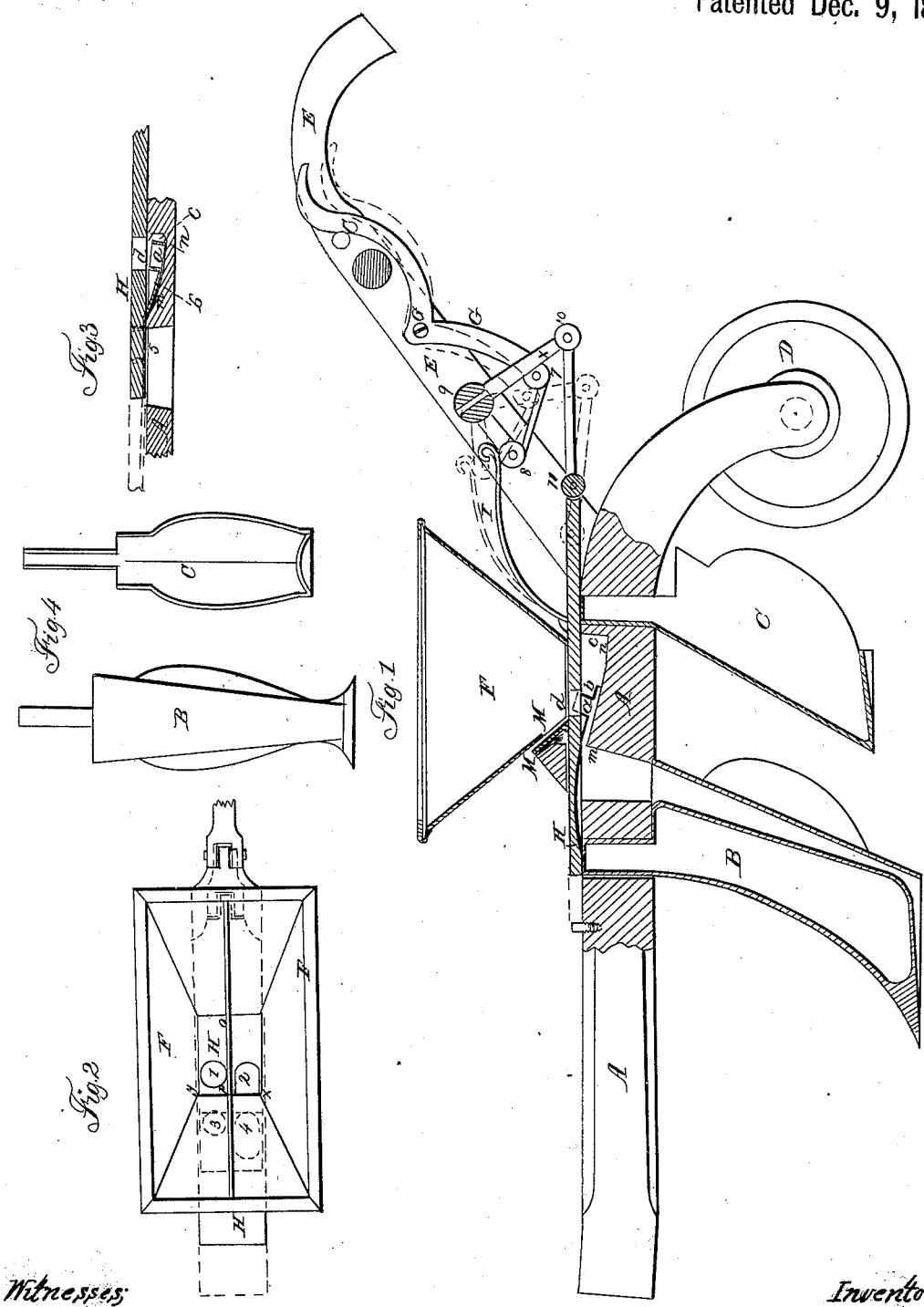

UNITED STATES PATENT OFFICE.

H. WYANT, OF KNOX COUNTY, INDIANA.

IMPROVEMENT IN SEED-PLANTERS.

Specification forming part of Letters Patent No. 16,198, dated December 9, 1856.

*To all whom it may concern:*

Be it known that I, HENRY WYANT, of Knox county, in the State of Indiana, have invented a new and useful Machine for Planting and Covering Corn, Cotton, and other Seed, which I hereby name "Henry Wyant's Improved Corn and other Seed Planter;" and I further declare that the following is a full, clear, and exact description of the construction and operation of the same, and hereby refer to the annexed drawings, and make the same a part of this specification, in which—

Figure 1 represents a vertical section through the machine. Fig. 2 represents a top view of the hopper, and shows the motion of the slide H. Fig. 3 represents a partial section through slide and beam, showing the depression of the ring or cup. Fig. 4 represents a back view of the conductor B and the regulator C.

To enable others skilled in implements of agriculture to fully comprehend, make, and use my invention, I will proceed to describe its construction and operation, and refer to the several parts by the letters and figures marked upon the drawings.

A represents the beam, which is of wood, of the ordinary size of plow-beams, and is four feet long, measuring from the center of the wheel or roller D. The beam commences curving down at a point immediately behind the point where the handles enter the beam, so that the roller or wheel may be attached to it.

B represents the plowshare and the conductor. The plowshare is placed immediately in front of the conductor. It is double flanged, and much smaller at the lower part of the flange than at the top, which causes the seed to be covered as soon as it is deposited out of the conductor. The double flanges serve to throw from the seed all clods, and cause the seed to be covered by the fine mold found at the bottom of the furrow. The plowshare will be twelve inches long below its connection with the beam, and will be constructed of smooth iron or steel, and of such dimension as will suit the soil in which it is intended to be used. The conductor is in the hind part of the plowshare, to which it belongs, and is situated between the flanges. It is one inch shorter than the share behind, and is made of the same material and forms a part of the share. The conductor receives the seed (and manure) from the rings or cups in the slide through a hole in the beam, and deposits the same in the ground immediately behind the plowshare.

C represents the regulator, which is fastened into the beam behind the conductor end, immediately forward of the handles. The regulator is double flanged, and is made of smooth iron or steel. It is fastened into the beam by means of a wedge driven down beside it in the beam, in the same manner as that used for fastening the plowshare to the common plow, which allows of being readily raised or lowered to graduate the depth of the soil covering the seed and the removal of lumps or clods from the hills.

D represents a wooden wheel or roller banded with iron. This iron-bound roller is one foot in diameter and four inches thick at the brim. This roller follows immediately after the regulator, and compresses the soil over and around the seed and breaks up any small clods that may escape from the regulator.

E represents the handles of the planter. They are of wood, of the usual size for plows, upon the inside of one of which is attached the lever which works the slide.

F represents the hopper, which has two apartments—one for seed and one for manure. The double black lines in Fig. 2 (marked by letters O P) represent that division. In Fig. 2, 1 represents the hole in the slide through which the seed passes, and 2 represents the hole in the same slide through which the manure passes from the hopper into the conductor. The size of the hopper will be made to suit convenience.

G G represent the lever attached to the handle. The lever is attached to the handle by a bolt, upon which it works at 6, which is near the center of the lever. The lower end of the lever is attached to a bridle with a moving joint at 7. The upper end of this bridle is attached to the iron upon which the spring I works at 8, with a moving joint likewise. This iron is four inches long, and is attached at 9 to an iron roller at the handle, and made fast to this roller. In the center of this roller, and at the center of the plow and at right angles to this four-inch iron rod, is attached firmly to the roller a six-inch-in-length rod of iron, (marked X,) to the lower end of which is attached the rod that works the slide. The joints at numbers 10 and 11 are movable joints, and the same as those at 8 and 7, while the ends of the iron rods that are attached to the roller are made stationary and move only with the roller.

I represents the spring. When stationary the spring is fastened with a gain into the beam just back of the hopper. It is placed at the side of the beam for the purpose of allowing the slide to work on the top of the beam. The upper end of the springs rests on the four-inch arm near to the joint at 8, but sufficiently on the arm to prevent its slipping off the elbow when working. The red lines in this figure represent the lever when in motion, and show the condition of the spring I when the lever G is pressed by the thumb, as also the position of each of the arms, elbows, and slide.

H represents the slide in motion. (See Fig. 2.) This slide works on top of the beam. 1 represents the hole in the slide in which the cup or ring works. 2 represents the hole (in Fig. 2) in the slide through which the manure passes. 3 and 4 represent the same holes when the slide is in motion.

A in Figs. 3 and 1 represents the cup or ring when at rest under the hopper.

$b$ represents the spring, one end of which is attached to the bottom of the ring or cup in such a way as not to impede the free passage of the seed, and the other end is let into the under side of the slide in such a way as to make a smooth surface, in order that the motion of the slide may not be impeded.

$d$ represents the hole in the slide in which the ring or cup works or rises.

C represents a notch or gain in the beam in which the ring or cup falls, when filling, to insure a plenty of seed to start with, as the brush-scraper will not allow too many to be deposited.

The slide H, when in motion, starting from the bottom of the hopper with cup or ring filled, carries along with it the spring $b$ up the inclined plane $m\ n$, forcing the cup gradually up through the slide, so that when it arrives at the farther edge of the hopper, near the conductor and the hole in the beam, the top of the cup or ring is level with the top of the slide, and the brush-scraper (in Fig. 1) M scrapes off all the surplus seed not required to be deposited and leaves the same in the hopper. The slide, the lever, the elbows, the working joints, and the roller to which the rectangular arms are attached, and the ring or cup are made of iron or other metallic substance, and the two springs I and $b$ are made of steel. The cup or ring is made smaller at the top than at the bottom, so as to prevent the cup from becoming clogged. The size of the cup and the size of the top of the cup should be regulated by the size of the seed.

X Y in Fig. 2 represent the point at which the brush-scraper is placed across the front part of the hopper, and M in Fig. 1 shows its position. This brush-scraper is made in the shape of a common brush, very narrow, of stiff hog-bristles.

Having described my improvement, what I claim as my invention, and desire to secure by Letters Patent, is—

The employment of the seed cup or ring $a$ and spring $b$, attached to and moving with the slide H, in combination with the inclined plane $m\ n$ of the beam, and brush M, operating in the manner and for the purposes set forth.

H. WYANT.

Witnesses:
 NATHL. USHER,
 JAMES LOW.